US008438077B2

(12) United States Patent
Walker et al.

(10) Patent No.: US 8,438,077 B2
(45) Date of Patent: *May 7, 2013

(54) METHOD AND APPARATUS FOR PROVIDING SUPPLEMENTARY PRODUCT SALES TO A CUSTOMER AT A CUSTOMER TERMINAL

(75) Inventors: Jay S. Walker, Ridgefield, CT (US); Andrew S. Vanluchene, Norwalk, CT (US); Daniel E. Tedesco, Stamford, CT (US)

(73) Assignee: Ebay, Inc., San Jose, CA (US)

( * ) Notice: Subject to any disclaimer, the term of this patent is extended or adjusted under 35 U.S.C. 154(b) by 2266 days.

This patent is subject to a terminal disclaimer.

(21) Appl. No.: 10/699,462

(22) Filed: Oct. 31, 2003

(65) Prior Publication Data

US 2004/0093271 A1    May 13, 2004

Related U.S. Application Data

(63) Continuation of application No. 08/994,426, filed on Dec. 19, 1997, now Pat. No. 6,694,500, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670, application No. 10/699,462, which is a continuation-in-part of application No. 08/982,149, filed on Dec. 1, 1997, now Pat. No. 6,196,458.

(51) Int. Cl.
*G06Q 30/00* (2012.01)

(52) U.S. Cl.
USPC .................................. 705/26.7; 705/14.38

(58) Field of Classification Search ............. 705/26, 705/26.7, 14.49; 382/100
See application file for complete search history.

(56) References Cited

U.S. PATENT DOCUMENTS

| | | | |
|---|---|---|---|
| 3,573,747 | A | 4/1971 | Adams et al. |
| 4,108,361 | A | 8/1978 | Krause |

(Continued)

FOREIGN PATENT DOCUMENTS

| | | |
|---|---|---|
| EP | 0 085 546 A2 | 8/1983 |
| EP | 0 109 189 A1 | 5/1984 |

(Continued)

OTHER PUBLICATIONS

Risk-based Pricing. Rich Peters. Credit World. Mar./Apr. 1993; vol. 81, issue 4. p. 14.*

(Continued)

*Primary Examiner* — Alexander Kalinowski
*Assistant Examiner* — John O Preston
(74) *Attorney, Agent, or Firm* — Haynes and Boone, LLP

(57) ABSTRACT

A system for providing supplementary product sales is provided in which a central controller, which may be operated by a credit card issuer, receives a purchase from a card authorization terminal. The purchase includes at least one purchase parameter, such as a customer account identifier, product identifiers for specifying items purchased or product price. The central controller determines a supplementary product to offer that is based on the at least one purchase parameter. A product identifier for specifying the supplementary product is transmitted to the card authorization terminal, where the customer chooses whether to accept the offered supplementary product. The card authorization terminal generates and transmits to the central controller a selection signal indicative of whether the supplementary product is accepted. If the selection signal indicates that the supplementary product is accepted, the central controller adjusts a balance of a financial account in dependence on an adjustment value associated with the supplementary product. The financial account may be, for example, a credit card account of the customer, the merchant controlling the card authorization terminal, or a merchant offering the accepted supplementary product. Thus, payment for the supplementary product or rewards for accepting the supplementary product may be transferred among various parties automatically.

18 Claims, 11 Drawing Sheets

U.S. PATENT DOCUMENTS

| | | | |
|---|---|---|---|
| 4,323,770 A | 4/1982 | Dieulot et al. | |
| 4,441,160 A | 4/1984 | Azcua et al. | |
| 4,494,197 A | 1/1985 | Troy et al. | |
| 4,500,880 A | 2/1985 | Gomersall et al. | |
| 4,669,730 A | 6/1987 | Small | |
| 4,677,553 A | 6/1987 | Roberts et al. | |
| 4,689,742 A | 8/1987 | Troy et al. | |
| 4,703,423 A | 10/1987 | Bado et al. | |
| 4,723,212 A | 2/1988 | Mindrum et al. | |
| 4,760,247 A | 7/1988 | Keane | |
| 4,815,741 A | 3/1989 | Small | |
| 4,825,045 A * | 4/1989 | Humble | 235/383 |
| 4,839,507 A | 6/1989 | May | |
| 4,854,590 A | 8/1989 | Jolliff et al. | |
| 4,859,838 A | 8/1989 | Okiharu | |
| 4,876,592 A | 10/1989 | Von Kohorn | |
| 4,882,473 A | 11/1989 | Bergeron et al. | |
| 4,902,880 A | 2/1990 | Garczynski et al. | |
| 4,908,761 A | 3/1990 | Tai | |
| 4,910,672 A | 3/1990 | Off et al. | |
| 4,922,522 A | 5/1990 | Scanlon | |
| 4,937,853 A | 6/1990 | Brule et al. | |
| 4,948,174 A | 8/1990 | Thomson et al. | |
| 4,973,952 A | 11/1990 | Malec et al. | |
| 4,982,337 A | 1/1991 | Burr et al. | |
| 4,993,714 A | 2/1991 | Golightly | |
| 5,025,372 A | 6/1991 | Burton et al. | |
| 5,056,019 A | 10/1991 | Schultz et al. | |
| 5,119,295 A | 6/1992 | Kapur | |
| 5,121,945 A | 6/1992 | Thomson et al. | |
| 5,128,862 A | 7/1992 | Mueller | |
| 5,132,914 A | 7/1992 | Cahlander et al. | |
| 5,172,328 A | 12/1992 | Cahlander et al. | |
| 5,173,851 A | 12/1992 | Off et al. | |
| 5,177,342 A | 1/1993 | Adams | |
| 5,191,525 A | 3/1993 | LeBrun et al. | |
| 5,192,854 A | 3/1993 | Counts | |
| 5,201,010 A | 4/1993 | Deaton et al. | |
| 5,202,826 A | 4/1993 | McCarthy | |
| 5,216,595 A | 6/1993 | Protheroe | |
| 5,223,698 A | 6/1993 | Kapur | |
| 5,231,569 A | 7/1993 | Myatt et al. | |
| 5,239,165 A | 8/1993 | Novak | |
| 5,243,515 A | 9/1993 | Lee | |
| 5,245,533 A | 9/1993 | Marshall | |
| 5,256,863 A | 10/1993 | Ferguson et al. | |
| 5,262,941 A | 11/1993 | Saladin et al. | |
| 5,274,547 A | 12/1993 | Zoffel et al. | |
| 5,283,731 A | 2/1994 | Lalonde et al. | |
| 5,287,268 A | 2/1994 | McCarthy | |
| 5,297,026 A | 3/1994 | Hoffman | |
| 5,297,031 A | 3/1994 | Gutterman et al. | |
| 5,302,811 A | 4/1994 | Fukatsu | |
| 5,305,195 A | 4/1994 | Murphy | |
| 5,309,355 A | 5/1994 | Lockwood | |
| 5,326,959 A | 7/1994 | Perazza | |
| 5,344,144 A | 9/1994 | Canon | |
| 5,353,218 A | 10/1994 | De Lapa et al. | |
| 5,353,219 A | 10/1994 | Mueller et al. | |
| 5,367,450 A | 11/1994 | Pintsov | |
| 5,371,796 A | 12/1994 | Avarne | |
| 5,380,991 A | 1/1995 | Valencia et al. | |
| 5,398,932 A | 3/1995 | Eberhardt et al. | |
| RE34,915 E | 4/1995 | Nichtberger et al. | |
| 5,420,606 A | 5/1995 | Begum et al. | |
| 5,434,394 A * | 7/1995 | Roach et al. | 235/375 |
| 5,458,284 A | 10/1995 | Haan et al. | |
| 5,459,306 A | 10/1995 | Stein et al. | |
| 5,481,094 A | 1/1996 | Suda | |
| 5,504,475 A | 4/1996 | Houdou et al. | |
| 5,510,979 A | 4/1996 | Moderi et al. | |
| 5,513,102 A | 4/1996 | Auriemma | |
| 5,539,189 A | 7/1996 | Wilson | |
| 5,564,546 A | 10/1996 | Molbak et al. | |
| 5,572,653 A | 11/1996 | DeTemple et al. | |
| 5,581,064 A | 12/1996 | Riley et al. | |
| 5,592,375 A | 1/1997 | Salmon et al. | |
| 5,592,376 A | 1/1997 | Hodroff | |
| 5,602,377 A | 2/1997 | Beller et al. | |
| 5,611,052 A | 3/1997 | Dykstra et al. | |
| 5,612,868 A | 3/1997 | Off et al. | |
| 5,615,269 A | 3/1997 | Micali | |
| 5,619,558 A | 4/1997 | Jheeta | |
| 5,620,079 A | 4/1997 | Molbak | |
| 5,621,201 A | 4/1997 | Langhans et al. | |
| 5,621,640 A | 4/1997 | Burke | |
| 5,621,812 A * | 4/1997 | Deaton et al. | 382/100 |
| 5,632,010 A | 5/1997 | Briechle et al. | |
| 5,638,457 A | 6/1997 | Deaton et al. | |
| 5,642,484 A | 6/1997 | Harrison et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,652,421 A | 7/1997 | Veeneman et al. | |
| 5,655,007 A | 8/1997 | McAllister | |
| 5,664,115 A | 9/1997 | Fraser | |
| 5,665,953 A | 9/1997 | Mazzamuto et al. | |
| 5,687,322 A | 11/1997 | Deaton et al. | |
| 5,724,886 A | 3/1998 | Ewald et al. | |
| 5,761,650 A | 6/1998 | Munsil et al. | |
| 5,832,457 A | 11/1998 | O'Brien et al. | |
| 5,845,259 A | 12/1998 | West et al. | |
| 5,857,175 A | 1/1999 | Day et al. | |
| 5,890,718 A | 4/1999 | Byon | |
| 5,946,665 A | 8/1999 | Suzuki et al. | |
| 5,970,469 A | 10/1999 | Scroggie et al. | |
| 5,999,914 A | 12/1999 | Blinn et al. | |
| 6,006,207 A | 12/1999 | Mumick et al. | |
| 6,014,634 A | 1/2000 | Scroggie et al. | |
| 6,016,504 A | 1/2000 | Arnold et al. | |
| 6,024,288 A | 2/2000 | Gottlich et al. | |
| 6,026,370 A | 2/2000 | Jermyn | |
| 6,064,987 A | 5/2000 | Walker et al. | |
| 6,070,147 A | 5/2000 | Harms et al. | |
| 6,088,682 A | 7/2000 | Burke | |
| 6,112,191 A | 8/2000 | Burke | |
| 6,115,641 A | 9/2000 | Brown et al. | |
| 6,119,099 A | 9/2000 | Walker et al. | |
| 6,138,105 A | 10/2000 | Walker et al. | |
| 6,196,458 B1 | 3/2001 | Walker et al. | |
| 6,267,670 B1 | 7/2001 | Walker et al. | |
| 6,292,786 B1 | 9/2001 | Deaton et al. | |
| 6,298,329 B1 | 10/2001 | Walker et al. | |
| 6,298,331 B1 | 10/2001 | Walker et al. | |
| 6,307,958 B1 | 10/2001 | Deaton et al. | |
| 6,321,210 B1 | 11/2001 | O'Brien et al. | |
| 2001/0013011 A1 | 8/2001 | Day et al. | |
| 2001/0014868 A1 | 8/2001 | Herz et al. | |

FOREIGN PATENT DOCUMENTS

| | | | |
|---|---|---|---|
| EP | 512413 A | | 11/1992 |
| EP | 607686 A | | 7/1994 |
| JP | 5242363 A | | 9/1993 |
| JP | 93168357 | | 3/1995 |
| JP | 8279007 A | | 10/1996 |
| WO | WO 96/29668 A | | 9/1996 |
| WO | WO 96/36926 | | 11/1996 |
| WO | WO 97/24680 A | | 7/1997 |
| WO | WO 97/28510 | | 8/1997 |
| WO | WO 97/35441 | | 9/1997 |
| WO | WO 97/46961 | | 12/1997 |
| WO | WO 00/75855 A2 | | 12/2000 |

OTHER PUBLICATIONS

Fine-tuning upsell techniques. Paul Miller. Catalog Age. Jul. 1995; vol. 12, issue 7. p. 61.*

Analysing customers with behavioural modelling. David Grafton. Credit Control. 1996; vol. 17, issue 6.*

Brochure: "Dining A La Card" Citibank.

"Introducing the Digital MenuBoard", Siren Technologies, Inc.

Rehayem, Gilbert, "Opinion: X-Press Betting", La Fleur's Lottery World, p. 4.

Brochure: "Reaching Out in New Directions", First Data Corporation, Merchant Services, undated.

"Cape Town", Reuters Ltd., Copyright 1979.

"Save the Mark", Financial Times (London), Feb. 1, 1983, Section I, Men & Matters, p. 12.

Cook, Louise, "ConsumerWatch: Clip, Snip, Save", The Associated Press, Mar. 12, 1984, Section: Business News.

Greene, Jan, "Farm bills please assns; National Grocers Association", Supermarket News, Dec. 23, 1985, Section: vol. 35, p. 6, ISSN: 0039-5803.

"POS spectrum: a lottery looks to POS for growth", POS News, Jan. 1989, Section: vol. 5, No. 7, p. 8, ISSN: 0896-6230, Coden: BHORAD.

Kuttner, Robert, "Computers May Turn the World Into One Big Commodities Pit", Business Week, Sep. 11, 1989, Section: Economic Viewpoint; No. 3123, p. 17.

Schrage, Michael, "An Experiment in Economic Theory; Labs Testing Real Markets", The Record, Nov. 26, 1989, Section: Business, p. B01.

"Let's Play the Cash Register Receipts Lottery", The New York Times, Dec. 25, 1990, Section 1, p. 30, col. 4, Editorial Desk.

Del Rosso, Laura, "Marketel says it plans to launch air fare 'auction' in June", Travel Weekly, Apr. 29, 1991, Section: vol. 50, No. 34, p. 1, ISSN: 0041-2082.

"Philips offers customers financing through Citicorp; Philips Medical Systems North America, Citicorp North America Inc.", Health Industry Today, Jun. 1991, Section: vol. 54, No. 6, p. 4, ISSN: 0745-4678.

Pelline, Jeff, "Travelers Bidding on Airline Tickets SF firm offers chance for cut-rate fares", The San Francisco Chronicle, Aug. 19, 1991, Section: News, p. A4.

Del Rosso, Laura, "Ticket-bidding firm closes its doors; Marketel International", Travel Weekly, Mar. 12, 1992, Section: vol. 51, No. 21, p. 1, ISSN: 0041-2082.

"Coupons get serious", Chain Store Age Executive with Shopping Center Age, Oct. 1992, Section: vol. 68, No. 10, p. 68, ISSN: 0193-1199.

"Winn-Dixie/The Salvation Army Report Contributions for War Against Hunger", PR Newswire, Jun. 10, 1993, Section: Financial News.

Jones, Jeanne, "Data Readers Streamline Management . . . ", The Houston Post, Jun. 26, 1994, Section: Business, p. D1.

Fiorini, Phillip, "No Place for Penny?", USA Today, Jul. 29, 1994, Section: News, p. 1A.

Smith, Alison, "Survey of UK Consumer Credit and Asset Finance", Financial Times, Nov. 3, 1994, p. VI.

Andreoli, Tom et al., "Cash Machines Offer a Whole Lotto Money . . . ", Crain's Chicago Business, Jun. 19, 1995, Section: News, p. 8.

"Spain: BBV launches new card", Cards International, Jun. 22, 1995, p. 5.

Knippenberg, Jim, "Will local radio empires strike back?", The Cincinnati Enquirer, Jul. 23, 1995, Section: Tempo, p. F01.

Silverman, Gene, "Planning and using infomercial campaigns effectively.", Direct Marketing, Sep. 1995, vol. 58, No. 5, p. 32(3), ISSN: 0012-3188.

"Cyberbid", Copyright 1996.

"Tecmark Reward Terminal™", Tecmark Services, Inc., (http //www tecmarkinc com/terminal htm), Copyright 1996.

McKinney, Jeff, "Merchant program could pay off for Provident", The Cincinnati Enquirer, Mar. 24, 1996, Section: Financial, p. E02.

Hadley, Kimberly, "Pastors praying anti-arson effort will burn bias", The Nashville Banner, Jul. 26, 1996, Section: News, p. A13.

Gapper, John, "NatWest reports rise in bad debt", Financial Times, Jul. 31, 1996, Section: News, UK, p. 09.

"Lynx Technology: Lynx to provide business leasing programme through Schroder Leasing", M2 Presswire, Aug. 9, 1996.

Taylor, Paul, "Towards a dream market", Financial Times, Sep. 4, 1996, Section: Survey—FT IT, p. 03.

"Bigger Plans (Provident Bank, issuer of MeritValue customer loyalty card . . . ", Card Fax, Oct. 7, 1996, vol. 96, No. 178, p. 2.

Fickenscher, Lisa, "Amex to Start Free Rewards Program with Discounts on Merchandise", The American Banker, Oct. 18, 1996, Section: Credit/Debit/ATMs, p. 10.

Fitzgerald, Kate, "Amex Program Moves Loyalty to Next Level: Custom Extras Finds a Medium Customers Can't Ignore: Billing Statements", Advertising Age, Nov. 4, 1996, Section: News, p. 2.

Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, Coden: JPBEBK.

Quittner, Jeremy, "Ohio's Provident brings its discount card to Fla.", American Banker, Feb. 11, 1997, vol. 162, Issue 28, p. 11, 1/3 pg., ISSN: 0002-7561.

Symons, Allene, "Lucky, Say-on debut Rewards Card.", Drug Store News, Feb. 17, 1997, vol. 19, Issue 4, p. 3, 2p, 1c., ISSN: 0191-7587.

Website: "Mastercard Purchasing Card", (http //www mastercard com/business/purchasingcard6 html), download date: Feb. 28, 1997.

Mckeveny, Alexander, "Giving them a good reason.", Bank Marketing, Mar. 1997, vol. 29, Issue 3, p. 37, 4p, 4c, ISSN: 0888-3149.

Singletary, Michelle, "Electronic World, Unchecked Problem?", The Washington Post, Mar. 4, 1997, Section: Financial, p. C01.

Fickenscher, Lisa, "Merchant: American Express Seeks to Mine Its Data on Cardholder Spending Patterns", The American Banker, Mar. 24, 1997, Section: Credit/Debit/ATMs, p. 20.

"Marketing Q&A #3", Frankie Hollywood's Public Relations Newsletter, Apr. 1-15, 1997, (http //www americasbrightest com/employer/frankie/news970401 html).

Davis, Charles, "Dispensing the future", Electronic Payments International, May 1997, Section: Feature, p. 12.

"Avco Financial Services.", (http //www homefurnish com/NHFA/avco htm), download date: May 23, 1997.

"Products and Services, Checkout Direct", Catalina Marketing Corporation, (http //catalinamktg com/prodcdir htm), download date: May 29, 1997.

"Industry Briefs", Card News, Jun. 9, 1997, vol. 12, No. 11.

Riordan, Teresa, "Patents; A novel approach to making a better spermicide harks back to some old-fashioned methods.", The New York Times, Jun. 9, 1997, Section D, p. 2, col. 1, Business/Financial Desk.

Nairn, Geoff, "The key to your identity: Falling costs will allow fingerprint verification to be widely used", Financial Times (London), Jul. 15, 1997, Section: Technology, p. 12.

"How It All Works", The United Computer Exchange, (http //www uce com/howitworks html), download date: Jul. 23, 1997.

"Classifieds2000: The Internet Classifieds", (http //www classifieds2000 com/cgi-cls/Display exe?C2K+aboutus), download date: Aug. 6, 1997.

"General trading information and terms provided by tradingfloor.com", Tradingfloor.com, (http //www tradingfloor com/info htm), download date: Aug. 14, 1997.

"Nasdaq", (http //home axford com/corfin/corfll htm), download date: Aug. 15, 1997.

Hoeschen, Brad, "Brookfield Square hopes mall card strikes a chord", Business Journal-Milwaukee, Sep. 12, 1997, Section: vol. 14, No. 50, p. 19.

Website, "NCR 7452 Workstation", (http //www ncr com/products/retail/products/catalogs/7452 shtm), download date: Sep. 23, 1997.

Brochure, "Custom Extras from American Express", Nov. 1997.

"NCR 7453 PC-Based Point-of-Sale Solution", NCR Corporation, Copyright 1998.

"For the Crew & the Customer", Olivetti, Winter, 1998.

"Examiner's Affidavit", U.S. Patent & Trademark Office, Feb. 22, 2001.

* cited by examiner

ACCOUNT IDENTIFIER 1111-1111-2222-2222  42

| TRANSACTION IDENTIFIER 56 | TRANSACTION TYPE 58 | DATE OF TRANSACTION 60 | POST DATE 62 | TRANSACTION AMOUNT 64 | MERCHANT IDENTIFIER 66 | ITEM IDENTIFIER 68 | DESCRIPTION 70 |
|---|---|---|---|---|---|---|---|
| 1234560 | PAYMENT RECEIVED | 11/1/99 | 11/1/99 | $431.17 | - | - | PAYMENT OF OCTOBER BILL |
| 1234561 | PURCHASE | 11/17/99 | 11/19/99 | $60.00 | 5677 | - | DINNER BILL |
| 1234562 | PURCHASE | 11/17/99 | 11/18/99 | $183.25 | 7890 | 82550098 | MEN'S SUIT |
| 1234563 | PURCHASE | 11/18/99 | 11/21/99 | $17.48 | 1234 | 11223344 | VIDEO TAPE |
| 1234564 | PURCHASE | 11/22/99 | 11/24/99 | $219.00 | 5678 | 88765432 | TELEVISION |
| 1234565 | PURCHASE | 11/23/99 | 11/24/99 | $13.31 | 1234 | 11339988 | VIDEO TAPE |

FIG. 3

| UPSELL IDENTIFIER 91 | MERCHANT IDENTIFIER 92 | FINANCIAL ACCOUNT 93 | UPSELL CONDITION 94 | UPSELL 96 | ADJUSTMENT VALUE 98 |
|---|---|---|---|---|---|
| A | 2345 | 12345678 | CUSTOMER NOT RECOGNIZED AS CURRENT MCI RECIPIENT | SWITCH TO MCI FOR TELEPHONE SERVICE | $25 CASH BACK |
| B | 6789 | 90123456 | CUSTOMER NOT RECOGNIZED AS CURRENT CON ED RECIPIENT AND NOT PREVIOUSLY OFFERED CON ED SERVICES | SIGN UP FOR CON ED UTILITY SERVICES | FREE PURCHASE (NOT TO EXCEED $100) |
| C | 9988 | 78901234 | PURCHASE INCLUDES MAGAZINE X | ONE YEAR SUBSCRIPTION TO MAGAZINE X | $38.00 PRICE |
| D | 7766 | 56789012 | PURCHASE INCLUDES A SNOWBOARD | SKI RESORT SEASON PASS | $500.00 PRICE |
| E | 8901 | 34567890 | TIME OF DAY IS BETWEEN 4:30PM AND 6:30 PM | $5.00 OFF McDONALDS FOOD | $4.50 PRICE |
| F | 5544 | 88112233 | NOT PREVIOUSLY OFFERED PRODUCT Z | PRODUCT Z | $6.00 PRICE |

FIG. 4

|  | ACCOUNT IDENTIFIER 1111-1111-2222-2222 | | | 102 |
|---|---|---|---|---|
|  | DATE 110 | OFFERED UPSELL IDENTIFIER 112 | ACCEPTED 114 | TRANSACTION IDENTIFIER 116 |
| 104 → | 11/22/99 | C | YES | 1234567 |
| 106 → | 11/22/99 | E | NO | 1234568 |
| 108 → | 11/23/99 | F | NO | 1234569 |

METHOD AND APPARATUS FOR PROVIDING SUPPLEMENTARY PRODUCT SALES TO A CUSTOMER AT A CUSTOMER TERMINAL

The present application is a continuation of U.S. patent application Ser. No. 08/994,426, entitled "METHOD AND APPARATUS FOR PROVIDING SUPPLEMENTARY PRODUCT SALES TO A CUSTOMER AT A CUSTOMER TERMINAL", filed on Dec. 19, 1997 and which issued as U.S. Pat. No. 6,694,500 on Feb. 17, 2004; which is a continuation-in-part of U.S. patent application Ser. No. 08/920,116, entitled "METHOD AND SYSTEM FOR PROCESSING SUPPLEMENTARY PRODUCT SALES AT A POINT-OF-SALE TERMINAL", filed on Aug. 26, 1997 and which issued as U.S. Pat. No. 6,119,099 on Sep. 12, 2000; which is a continuation-in-part of U.S. patent application Ser. No. 08/822,709, entitled "SYSTEM AND METHOD FOR PERFORMING LOTTERY TICKET TRANSACTIONS UTILIZING POINT-OF-SALE TERMINALS", filed on Mar. 21, 1997- and which issued as U.S. Pat. No. 6,267,670 B1 on Jul. 31, 2001, each of which are incorporated herein by reference as part of the present disclosure. The present application is also a continuation-in-part of U.S. patent application Ser. No. 08/982,149, entitled "METHOD AND APPARATUS FOR PRINTING A BILLING STATEMENT TO PROVIDE SUPPLEMENTARY PRODUCT SALES", filed on Dec. 1, 1997, which issued as U.S. Pat. No. 6,196,458 B1 on Mar. 6, 2001, and which is incorporated herein by reference as part of the present disclosure.

RELATED APPLICATIONS

The following commonly owned patent applications may be considered related to the present application: U.S. patent application Ser. No. 09/045,036 entitled "METHOD AND APPARATUS FOR FACILITATING THE PLAY OF FRACTIONAL LOTTERY TICKETS UTILIZING POINT-OF-SALE TERMINALS", filed Mar. 20, 1998 in the name of Walker et al.; U.S. patent application Ser. No. 09/045,386 entitled "METHOD AND APPARATUS FOR CONTROLLING THE PERFORMANCE OF A SUPPLEMENTARY PROCESS AT A POINT OF SALE TERMINAL", filed Mar. 20, 1998 in the name of Walker et al.; U.S. patent application Ser. No. 09/045,518 entitled "METHOD AND APPARATUS FOR PROCESSING A SUPPLEMENTARY PRODUCT SALE AT A POINT-OF-SALE TERMINAL", filed Mar. 20, 1998 in the name of Walker et al.; and U.S. patent application Ser. No. 09/107,971 entitled "METHOD AND APPARATUS FOR FACILITATING THE PLAY OF FRACTIONAL LOTTERY TICKETS UTILIZING POINT-OF-SALE TERMINALS", filed Jun. 30, 1998 in the name of Walker et al.

FIELD OF THE INVENTION

The present invention relates to point-of-sale terminals, and, more specifically, to methods and systems for processing product sales at point-of-sale terminals.

BACKGROUND OF THE INVENTION

In many stores, purchases are consummated at a point of sale ("POS") terminal which includes a card authorization terminal ("CAT"), such as those manufactured by Verifone, Inc., for reading cards such as credit cards and debit cards and generating data relating to a purchase. During a sale, the CAT typically communicates, directly or indirectly, with a credit card issuer's computer that maintains customer financial accounts. The CAT transmits purchase data, such as a customer's credit card account number, a merchant identifier for specifying the merchant selling the purchase, a purchase price and the items included in the purchase. The issuer computer receives this purchase data from the CAT, and determines whether to authorize the purchase. If the purchase is authorized, the issuer computer debits the customer's financial account by the purchase price and stores some or all of the purchase data for subsequent use in generating a billing statement.

The issuer computer thus accumulates information about the customer's purchases. Such information may be used in providing rewards to a customer in return for past purchases with the financial account. For example, in the "U$AVE" program promoted by First Data Corporation, credit card account holders are automatically provided a discount on a present purchase. The discount is based on previous purchases the customer has made, and typically takes the form of a reduced purchase price or a credit on the customer's credit card account. Similarly, the American Express "Express Rewards" program reduces a customer's purchase price if he has made certain types of purchases in the past, and the American Express "Custom Extras" program alerts credit card account holders to savings from particular merchants on their billing statements.

At best, such systems utilize information about customers' purchases to provide rewards for past purchases. Merchants hope that customer anticipation of such rewards may generate future sales. However, there is no guarantee that merchants will enjoy additional business from the customers. In addition, customers may not always remember which types of purchases will eventually yield rewards. Accordingly, the rewards may not provide a strong incentive to make purchases.

SUMMARY OF THE INVENTION

It is an object of the present invention to provide a method and apparatus for offering supplementary product sales to a customer via a card authorization terminal.

In accordance with the present invention, a central controller, which may be operated by a credit card issuer, receives a signal indicative of a purchase from a card authorization terminal. The purchase signal includes at least one purchase parameter, such as a customer account identifier, product price or product identifiers for specifying items purchased. The central controller determines a supplementary product to offer that is based on the at least one purchase parameter. A product identifier for specifying the supplementary product is transmitted to the card authorization terminal, where the customer chooses whether to accept the offered supplementary product. The card authorization terminal generates and transmits to the central controller a selection signal indicative of whether the supplementary product is accepted.

If the selection signal indicates that the supplementary product is accepted, the central controller adjusts the balance of one or more financial accounts in dependence on an adjustment value associated with the supplementary product. The financial accounts may be, for example, a credit card account of the customer, a bank account of the merchant controlling the card authorization terminal, and/or a bank account of a merchant offering the accepted supplementary product. Thus, payment for the supplementary product or rewards for accepting the supplementary product may be transferred among various parties automatically.

BRIEF DESCRIPTION OF THE DRAWINGS

FIG. 3 is a schematic illustration of a record of an account holder transaction database of the central controller of FIG. 2.

FIG. 4 is a schematic illustration of an upsell database of the central controller of FIG. 2.

FIG. 5 is a schematic illustration of a record of an accepted upsell database of the central controller of FIG. 2.

DETAILED DESCRIPTION OF THE PREFERRED EMBODIMENTS

The present invention provides merchants with the ability to make sales through the POS terminals and stores of other merchants, without registering, associating or affiliating with any of those other merchants. Accordingly, the present invention allows a "sponsoring merchant" to target and sell to customers making purchases at virtually any store having a card authorization terminal. In effect, the card authorization terminal may be shared by more than one merchant. Applicants are not aware of any other system that allows third parties to sell through another's POS terminal or card authorization terminal.

One benefit of the present invention is that a sponsoring merchant need register with only a credit card issuer rather than with a plurality of other merchants. The credit card issuer is involved in every transaction on many credit card accounts, and thus is able to maintain records for each transaction of an account holder. Accordingly, customers are not required to make purchases at any particular merchant, but may make purchases at any merchant that accepts credit cards. By contrast, a single merchant may, at best, track and maintain records only for transactions involving that merchant. Thus, a large number of transactions cannot be easily recorded by any one merchant.

Furthermore, the methods and apparatus of the present invention provide offers for supplementary products ("upsells") which are individually customized to be more desirable and acceptable to each customer, rather than offers which are provided to every customer. The offers, if accepted, can provide the customer with immediate gratification, for example, by providing a product or a discount, or by providing a voucher that may be redeemed for a product or other reward.

The description that follows is arranged into the following sections: Receiving Transactions, Determining a Product, Customer Selection and Adjusting a Balance of a Financial Account.

Receiving Transactions

Figure 1:
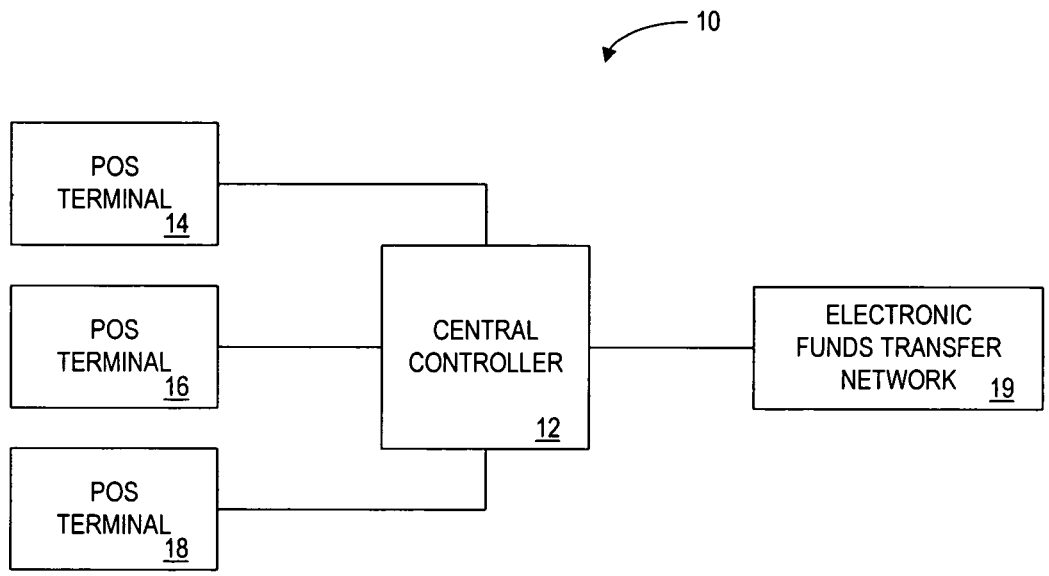
FIG. 1 is a schematic illustration of an apparatus for providing supplementary product sales to a customer at a card authorization terminal.

Referring to FIG. 1, an apparatus 10 comprises a central controller 12 in communication with each of POS terminals 14, 16 and 18. Although three POS terminals are shown in FIG. 1, any number of POS terminals may be in communication with the central controller 12. The central controller 12 may be in communication with the POS terminals 14, 16 and 18 through any of a number of known connection methods, such as through an Internet connection or a wireless communication protocol. The central controller 12 is typically operated by or on behalf of a credit card issuer, such as CitiBank, a credit card clearing house, such as First Data Corporation, or a product manufacturer, such as Sony Corporation. The central controller 12 is also in communication with an electronic funds transfer ("EFT") network 19, thereby permitting the central controller 12 to transfer funds among financial accounts.

Each of the POS terminals 14, 16 and 18 includes a CAT, such as those manufactured by Verifone, Inc., or a similar device for generating data relating to a purchase, such as purchase price, the item(s) purchased, and other purchase parameters. The POS terminals 14, 16 and 18 transmit this generated data to the central controller 12, thereby informing the central controller 12 of the data relating to the purchase. The POS terminals 14, 16 and 18 may transmit information to the central controller 12 in many different forms. For example, each of the POS terminals 14, 16 and 18 may include a credit card reader (not shown) which uses the MasterCard Purchasing Card Level III protocol to transmit a credit card account number, data identifying the items purchased and other purchase-related information, to the central controller 12. In addition, the POS terminals 14, 16 and 18 can encrypt the data relating to a purchase for security purposes, and transmit the encrypted data to the central controller 12, which decrypts the encrypted data. Many encryption and decryption techniques are well known, and described in the text "Applied Cryptography, Protocols, Algorithms, and Source Code in C", Second Edition, by Bruce Schneier.

Figure 2:
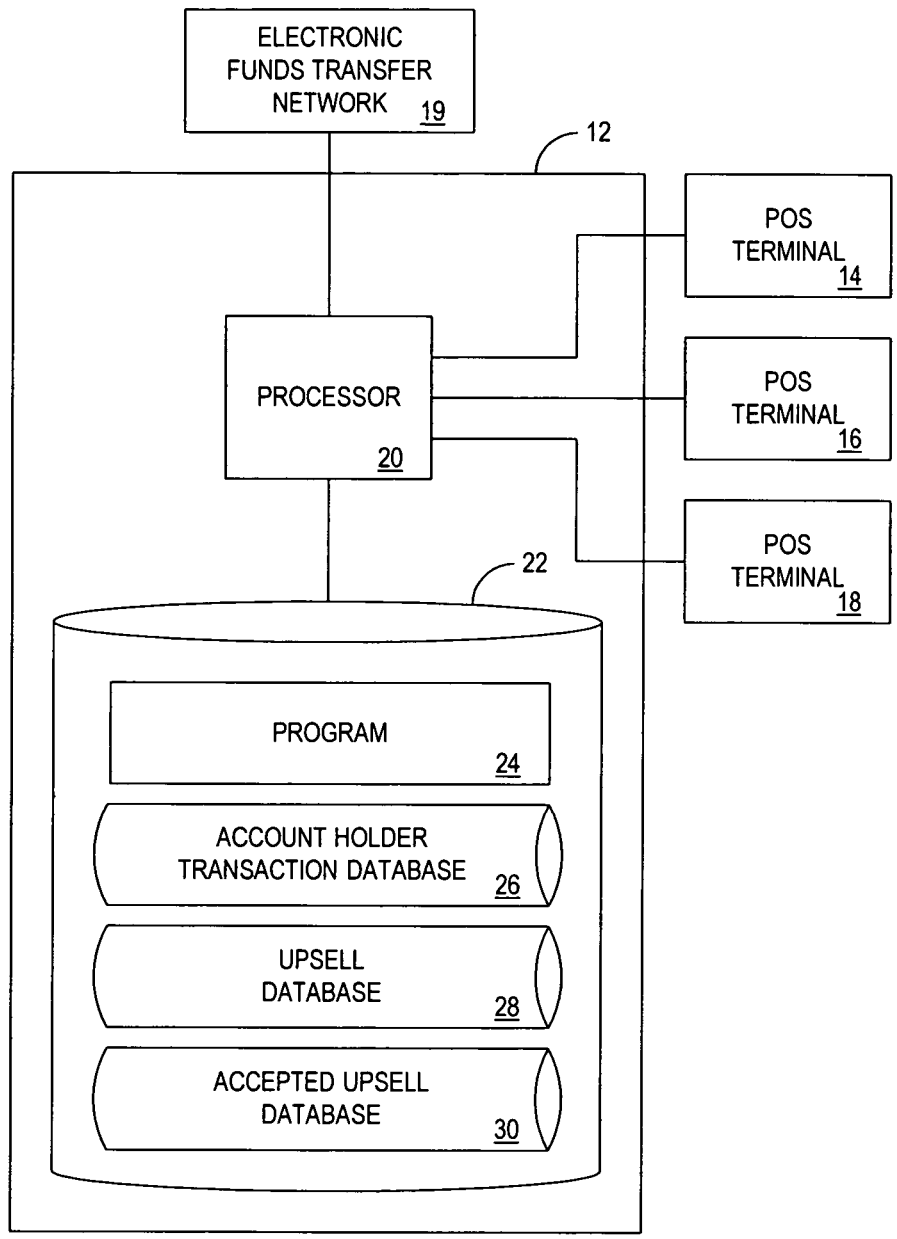
FIG. 2 is a schematic illustration of a central controller of the apparatus of FIG. 1.

Referring to FIG. 2, the central controller 12 comprises a processor 20, such as one or more conventional microprocessors, which is connected to a data storage device 22, such as an appropriate combination of magnetic, optical and semiconductor memory. The processor 20 is in communication with each of the POS terminals 14, 16 and 18 and with the EFT network 19. The processor 20 and the storage device 22 may each be (i) located entirely within a single computer or other computing device; (ii) connected to each other by a remote communication link, such as a serial port cable, telephone line or radio frequency transceiver; or (iii) a combination thereof. For example, the central controller 12 may comprise one or more computers which are connected to a remote server computer for maintaining databases.

The storage device 22 stores (i) a program 24 for controlling the processor 20; (ii) an account holder transaction database 26; (iii) an upsell database 28; and (iv) an accepted upsell database 30. The program 24 drives the processor 20 to operate in accordance with the present invention, and particularly in accordance with the methods described in detail herein. The program 24 furthermore includes program elements that may be necessary, such as "device drivers" for allowing the processor to interface with computer peripheral devices.

Appropriate device drivers and other necessary program elements are known to those skilled in the art, and need not be described in detail herein. The databases 26, 28 and 30 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Referring to FIG. 3, a record 40 of the account holder transaction database 26 (FIG. 2) defines the transactions applied against an account that is identified by an account identifier 42. The account holder transaction database 26 (FIG. 2) typically includes a plurality of records such as the record 40, and each record defines the transactions applied against an account holder's account. The record 40 includes entries 44, 46, 48, 50, 52 and 54 which each describe a transaction applied against the account holder account identified by the account identifier 42. Each of the entries 44, 46, 48, 50, 52 and 54 specifies (i) a transaction identifier 56 for uniquely indicating a transaction; (ii) a transaction type 58; (iii) a date 60 of the transaction; (iv) a date 62 when the transaction is "posted" (made available to the central controller 12 of FIG. 1); (v) a transaction amount 64; (vi) a merchant identifier 66 for specifying a merchant participating in the transaction; (vii) an item identifier 68 for specifying an item purchased, if any; and (viii) a description 70 of the transaction. It will be understood by those skilled in the art that each record of the account holder transaction database 26 (FIG. 2) may include any number of entries.

In summary, data relating to a purchase is transmitted from a POS terminal to the central controller 12 (FIG. 2), where the data is stored. The central controller 12 in turn processes the data to determine a supplementary product to offer.

Determining a Product to Offer

In the system of the present invention, at least one sponsoring merchant may sell its products (goods and/or services) through POS terminals it does not own or control. The sponsoring merchant first specifies to the central controller 12 (FIG. 1) a supplementary product to offer, the conditions under which to offer the supplementary product, and the price required of the customer or the reward provided to the customer in exchange for accepting the supplementary product. Then, based on purchase data from a POS terminal, the central controller 12 determines whether customers meet the conditions and therefore should be offered the supplementary product.

Referring to FIG. 4, the upsell database 28 stores entries 82, 84, 86, 88, 89 and 90 which each define a potential supplementary product offer. Each of the entries 82, 84, 86, 88, 89 and 90 includes (i) an upsell identifier 91 for uniquely identifying the potential supplementary product (upsell) offer, (ii) a merchant identifier 92 for identifying the merchant offering the supplementary product, (iii) a financial account identifier 93 for specifying a financial account of the merchant for receiving or paying funds; (iv) an upsell condition identifier 94 for specifying at least one condition under which to offer the upsell, (v) an upsell identifier 96 for specifying a supplementary product (upsell) to be offered when the at least one offer condition is met, and (vi) an adjustment value 98 to a specified financial account.

Each condition identifier may depend on one or more purchase parameters. For example, the purchase parameter may be at least one product identifier for specifying an item purchased. A corresponding condition for offering the supplementary product would be that the specified item was included in the customer's purchase. Another purchase parameter is the purchase price. A corresponding condition for offering the supplementary product would be that the customer's purchase price was below a predetermined threshold, above a predetermined threshold or within a predetermined range. Another purchase parameter is an indication of time, such as a date, a time of day, a day of the week, season or a combination thereof. A corresponding condition for offering the supplementary product would be that the time of the purchase corresponded to the specified indication of time. Another purchase parameter is a merchant identifier specifying the merchant that owns or controls the CAT. A corresponding condition for offering the supplementary product would be that the merchant identifier is a predetermined identifier, or the merchant identifier identifies a merchant having a predefined standard industry classification (SIC) code.

A customer account identifier for specifying a customer account is a purchase parameter that may be used in many different types of conditions. The customer account may be a credit card account, frequent shopper account or other account that indicates a customer. The customer account identifier is typically stored on a card, read by a card authorization terminal and transmitted to the central controller 12 (FIG. 1). The customer account specifies a customer, and thus may be used to determine past purchases made by the customer. For example, the customer account may be used to determine a customer's past transactions which are stored in the account holder transaction database 26 (FIG. 2). A corresponding condition for offering a supplementary product would be that a previous purchase included one or more predetermined products.

The customer account may also be used to determine past supplementary products that have been offered to the customer. A corresponding condition for offering a supplementary product would be that one or more predetermined supplementary products had been offered to the customer. Past offers are stored in the accepted upsell database 30 (FIG. 2) of the central controller 12.

Referring to FIG. 5, a record 100 of the accepted upsell database 30 (FIG. 2) defines supplementary products that were previously offered to an account holder identified by an account identifier 102. The accepted upsell database 30 (FIG. 2) typically includes a plurality of records such as the record 100, each defining the supplementary products that were previously offered to an account holder. The record 100 includes entries 104, 106 and 108 which each describe a supplementary product that was previously offered to the account holder. Each of the entries 104, 106 and 108 specifies (i) a date 110 when the supplementary product was offered to the customer, (ii) an offered upsell identifier 112 which uniquely identifies the offered supplementary product, and which corresponds to the upsell identifier 91 of the upsell database 28 of FIG. 4, (iii) an indication 114 of whether the offered supplementary product was accepted by the customer, and (iv) a transaction identifier 116 for uniquely indicating the transaction during which the supplementary product was accepted, and which corresponds to the transaction identifier 56 shown in FIG. 3 with reference to the record 40. It will be understood by those skilled in the art that the accepted upsell database 30 (FIG. 2) may include any number of records, and each record may include any number of entries.

The accepted upsell database 30 (FIG. 2) may be used for marketing analysis, and specifically to determine how to more accurately select upsells to be offered, so that account holders are more likely to accept the offers. In addition, the accepted upsell database 30 may be used to assure that upsells which were previously offered to and rejected by an account holder will not be offered to the same account holder again.

Since the customer account specifies a customer, the customer account may also be used to determine other customer-specific information from third parties. The customer account may specify a customer by name and address, which in turn may be used to identify, for example, the customer's credit history, telephone service provider, cable service provider and utility service provider. Some corresponding conditions for offering a supplementary product based on such customer information would be that the customer did not subscribe to a particular utility service provider, or that the customer had recently switched telephone service providers. Other types of information and corresponding conditions will be understood by those skilled in the art.

Those skilled in the art will understand that determining whether any upsell condition is satisfied may be accomplished in many ways. For example, the central controller 12 may, for each entry in the upsell database 28, determine if the corresponding upsell condition of the entry is satisfied. Referring again to FIG. 4, if a purchase satisfies an upsell condition 94 of the upsell database 28, the corresponding upsell 96 is offered. If the purchase parameters of a customer's purchase satisfy more than one upsell condition, one corresponding upsell may be selected and offered. Alternatively, more than one corresponding upsell may be offered, as described in detail below.

Many types of upsells may be offered, and the description below illustrates some, but not all, possible types of offered upsells. Other types of upsells will be apparent to those skilled in the art. Some types of upsells include (i) a use-based service agreement such as an agreement for telephone service or electric utility service, (ii) a subscription to a magazine or other periodical, and (iii) a predetermined discount off of a future purchase. Once the upsell(s) to offer have been determined, the central controller 12 (FIG. 1) transmits a product identifier for each upsell to the POS terminal from which the purchase data originated.

Figure 6:
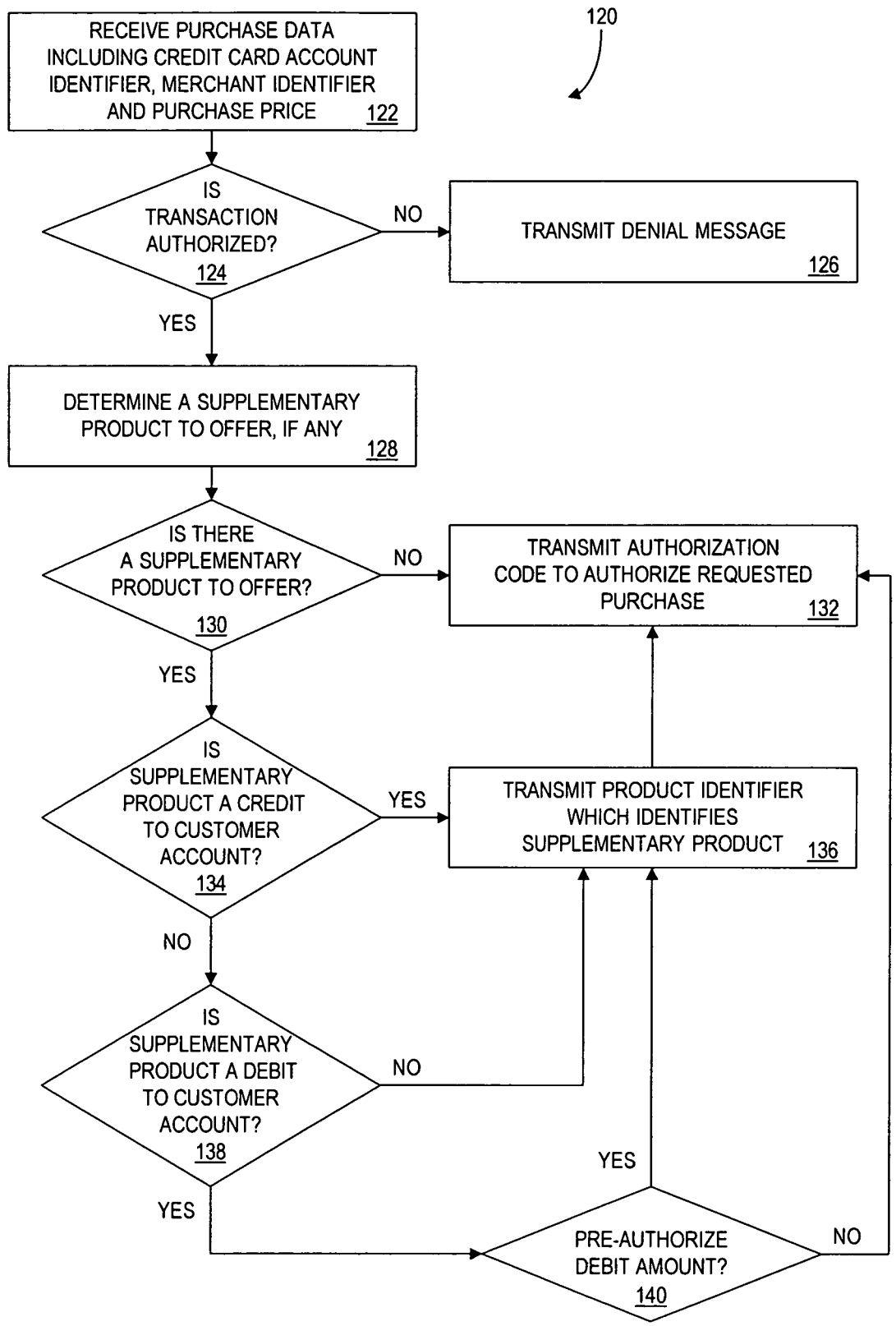
FIG. 6 is a flow chart illustrating a method for providing supplementary product sales to a customer at a card authorization terminal.

Referring to FIG. 6, a method 120 performed by the central controller 12 (FIG. 1) is initiated when the central controller 12 receives purchase data from a CAT (step 122). As is known in the art, the central controller determines if the received purchase data indicates an authorized transaction (step 124). Typically, the step 124 includes determining whether the customer's credit card account may be debited by the purchase price without exceeding an account balance limit. If the transaction is not authorized, the central controller 12 transmits a message to the CAT indicating that the purchase is denied (step 126). If, however, the transaction is authorized, the central controller determines whether a supplementary product is to be offered to the customer and, if so, identifies the supplementary product with an identifier (step 128). If there is no supplementary product to be offered (step 130), then the central controller transmits an authorization code to the CAT (step 132), thereby informing the CAT in a known manner that the purchase may be accepted.

If there is a supplementary product to be offered, the central controller 12 determines if the supplementary product will involve crediting the customer's account (step 134). If so, then the central controller 12 transmits to the CAT a product identifier that identifies the supplementary product (step 136), and also transmits an authorization code (step 132). If not, the central controller 12 determines if the supplementary product will involve debiting the customer's account (step 138). If so, the central controller 12 determines whether to pre-authorize the debit amount (step 140). For example, the central controller may ascertain whether the customer's credit card account may be further debited with the debit amount without exceeding the account balance limit. If so, the central controller 12 transmits the product identifier and an authorization code (steps 136 and 132 respectively). If not, the central controller 12 transmits the authorization code (step 132).

Customer Selection

The POS terminal receives one or more product identifiers, each specifying an offered upsell, from the central controller 12. The product identifier may comprise descriptive text such as the name of the upsell, a price of the upsell, the name of the merchant offering the upsell, or a combination thereof. Thus, the POS terminal may display the received text on a display region of the corresponding CAT. In such an embodiment, conventional POS terminals which receive and display transmitted text would be able to present upsell offers to customers. Alternatively, each product identifier may comprise a unique code that indicates text to display. In such an embodiment, the POS terminal would employ each unique code as an indicator to a textual description stored either in the POS terminal or in a storage area in communication with the POS terminal. For example, the unique code could be used as an index to a look-up table containing stored descriptive text. The POS terminal would access and display the text corresponding to the unique code on the display region of the corresponding CAT.

Once the customer is made aware of the offered upsell, he indicates whether he will accept the upsell. In one embodiment, the customer informs a clerk or other operator of the POS terminal of whether he accepts. The operator in turn presses a button on the POS terminal or otherwise operates the POS terminal to generate a selection signal indicative of whether the upsell is accepted. Alternatively, the customer may himself operate the POS terminal, CAT or hardware attached thereto to generate the selection signal. The selection signal is transmitted to the central controller 12.

If more than one product identifier is transmitted to the POS terminal, the central controller 12 may transmit the plurality of product identifiers substantially simultaneously. In such an embodiment, the POS terminal would be able to offer substantially simultaneously more than one upsell. Alternatively, the central controller 12 may transmit a first product identifier, and only transmit subsequent product identifiers after receiving from the POS terminal a selection signal which indicates that the first offered upsell was not accepted.

Figure 7:
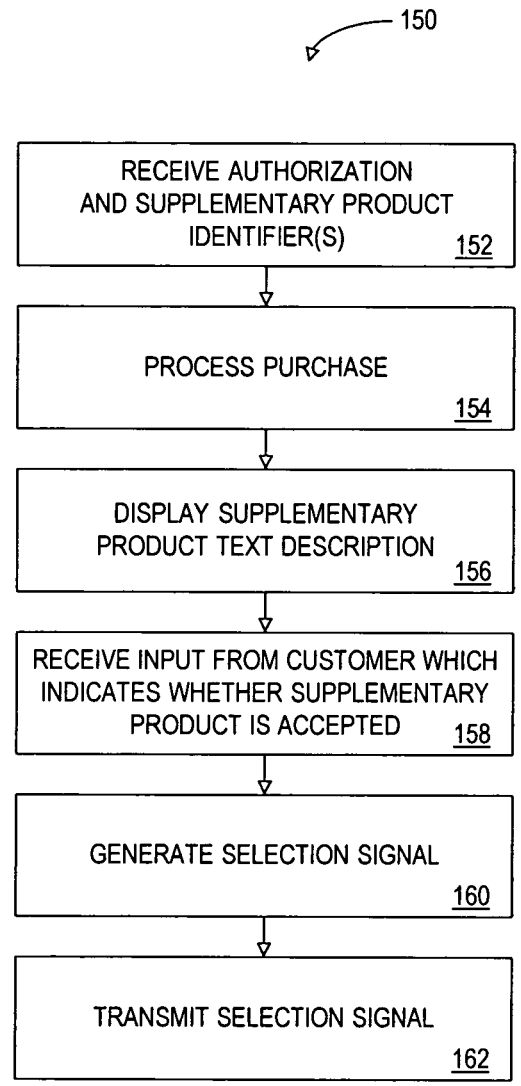
FIG. 7 is a flow chart illustrating a method, performed by a card authorization terminal, for providing supplementary product sales to a customer.

Referring to FIG. 7, a process 150 performed by the CAT is initiated when the CAT receives an authorization code for a purchase and one or more supplementary product identifiers (step 152) from the central controller 12. The CAT processes the purchase in a known manner (step 154). For example, the CAT may communicate with an electronic cash register to print a receipt for the purchase and adjust inventory records to reflect the sold items included in the purchase. In addition, a text description of the supplementary product offer is displayed to the customer (step 156). The customer indicates whether he accepts the offer (step 158) and a selection signal is generated accordingly (step 160). The selection signal is then transmitted to the central controller (step 162).

Adjusting a Balance of a Financial Account

The central controller 12 receives the selection signal from the POS terminal. If the selection signal indicates that the upsell is accepted, the central controller 12 determines an adjustment value corresponding to the selected upsell. The adjustment value specifies both an amount by which to adjust one or more financial accounts and an indication of the account(s) to be adjusted. The financial account may be, for example, the customer's credit card account or a merchant's financial account, depending on the selected upsell. The central controller 12 adjusts a balance of each indicated financial account in dependence on the adjustment value.

Figure 8:
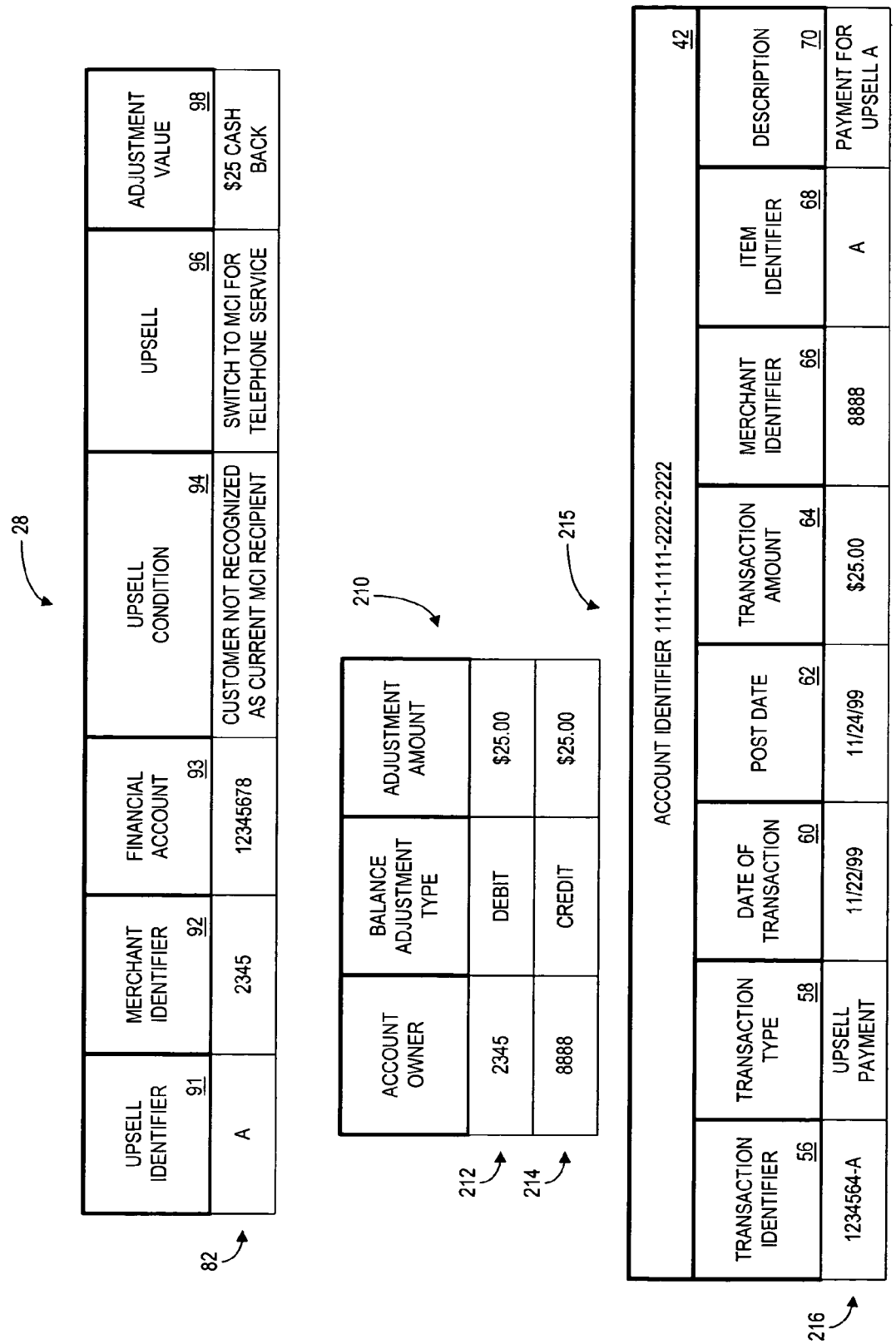
FIG. 8 is a schematic illustration of records employed in illustrating a use of an adjustment value.

Referring to FIG. 8, the entry 82 of FIG. 4 is depicted for use in the following exemplary use of an adjustment value. In this example, the customer makes a purchase at a POS terminal that is controlled by a merchant identified by "8888". As is known in the art, purchase data originating from a POS terminal typically includes a merchant identifier so that the central controller 12 may identify the owner/operator of the POS terminal. The POS terminal displays an offer for the upsell specified by the entry 82 (switch to MCI telephone service). After the customer selects the offered upsell, the central controller 12 determines the corresponding adjustment value 98 ("$25 cash back"), indicating that the customer is to receive $25 from the POS terminal operator in return for accepting the upsell. Thus, the merchant "8888" will remit $25 to the customer.

The entry 82 also specifies that the merchant offering the upsell is a merchant identified by "2345". Accordingly, the merchant "2345" is to reimburse the merchant "8888", directly or indirectly, for the $25 remitted to the customer. A table 210 shows the reconciliation between the merchants. Such a table may merely represent transactions that the central controller 12 performs, and/or may correspond to an actual database of transactions stored on the central controller 12. The central controller 12 may, for example, debit a financial account belonging to merchant "2345" by $25, as illustrated by the entry 212 of the table 210. In addition, the central controller 12 credits a financial account belonging to merchant "8888" by $25, as shown by the entry 214 of the table 210. In order to provide the upsell to the customer (i.e. switch the customer's telephone service to MCI™), the central controller 12 also transmits the customer account identifier to an MCI™ computer or similar receiving device, along with notice that the upsell has been accepted, thereby informing MCI™ of its new customer. The customer account identifier may further include information such as the customer's address, or such information may be determined from the identifier.

The financial transactions described by the table 210 may further describe transactions applied against respective financial accounts of the necessary parties, i.e. the merchant "2345" and the merchant "8888". As shown by the financial account 93 of the entry 82, the merchant "2345" has a financial account "12345678". A record 215 of the account holder transaction database 26 (FIG. 2) defines the transactions applied against the account "12345678". The displayed entry 216 of the record 215 describes a transaction corresponding to the $25.00 debit described by the entry 212 of the table 210. A similar entry for the $25.00 credit would exist in a record (not shown) defining transactions applied against the account of merchant "8888". The transaction identifier "1234564-A" of the entry 216 comprises a prefix "1234564" and a suffix "A", thereby illustrating that the entry 216 defines an accepted upsell "A" that was generated for a transaction "1234564". Those skilled in the art will understand that there are other methods for associating a transaction defined by an upsell with a purchase transaction.

Figure 9:
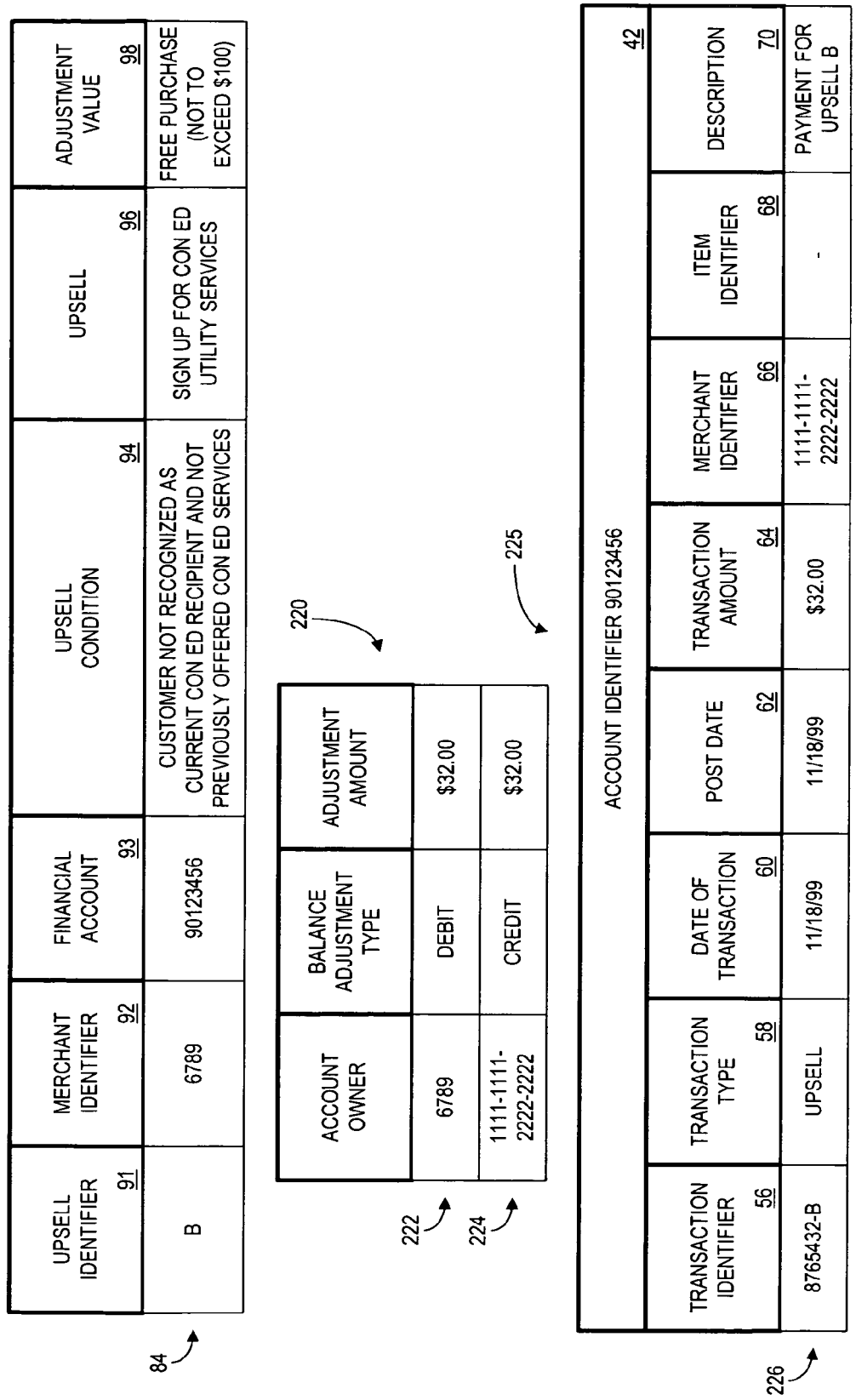
FIG. 9 is a schematic illustration of records employed in illustrating another use of an adjustment value.

Referring to FIG. 9, the entry 84 of FIG. 4 is depicted for use in the following additional exemplary use of an adjustment value. In this example, the customer makes a $32 purchase at a POS terminal that is controlled by a merchant identified by "9999". The POS terminal displays an offer for the upsell specified by the entry 84 (sign up for ConEd™ utility service). After the customer selects the offered upsell, the central controller 12 determines the corresponding adjustment value 98 (free purchase), indicating that the customer receives a free purchase in return for accepting the upsell. Thus, the customer will ultimately not have to pay the $32 purchase price.

The entry 84 also specifies that the merchant offering the upsell is a merchant identified by "6789". Accordingly, the merchant "6789" is to pay the $32 purchase price by reimbursing the customer for his payment. A table 220 shows the reconciliation between the merchant "6789" and the customer. Such a table may merely represent transactions that the central controller 12 performs, or may correspond to an actual database of transactions stored on the central controller 12. The central controller 12 may, for example, debit a financial account belonging to merchant "6789" by $32, as illustrated by the entry 222 of the table 220. In addition, the central controller 12 credits a financial account belonging to the customer by $32, as shown by the entry 224 of the table 220.

The financial transactions described by the table 220 may further describe transactions applied against respective financial accounts of the necessary parties, i.e. the merchant "6789" and the customer, who has the account "1111-1111-2222-2222". As shown by the financial account 93 of the entry 84, the merchant "6789" has a financial account "90123456". A record 225 of the account holder transaction database 26 (FIG. 2) defines the transactions applied against the account "90123456". The displayed entry 226 of the record 225 describes a transaction corresponding to the $32.00 debit described by the entry 222 of the table 220. A similar entry for the $32.00 credit to the customer account would exist in a record (not shown in FIG. 9) defining transactions applied against the customer account "1111-1111-2222-2222". The transaction identifier "8765432-B" of the entry 226 comprises a prefix "8765432" and a suffix "B", thereby illustrating that the entry 226 defines an accepted upsell "B" that was generated for a transaction "8765432". Those skilled in the art will understand that there are other methods for associating a transaction defined by an upsell with a purchase transaction.

Figure 10:
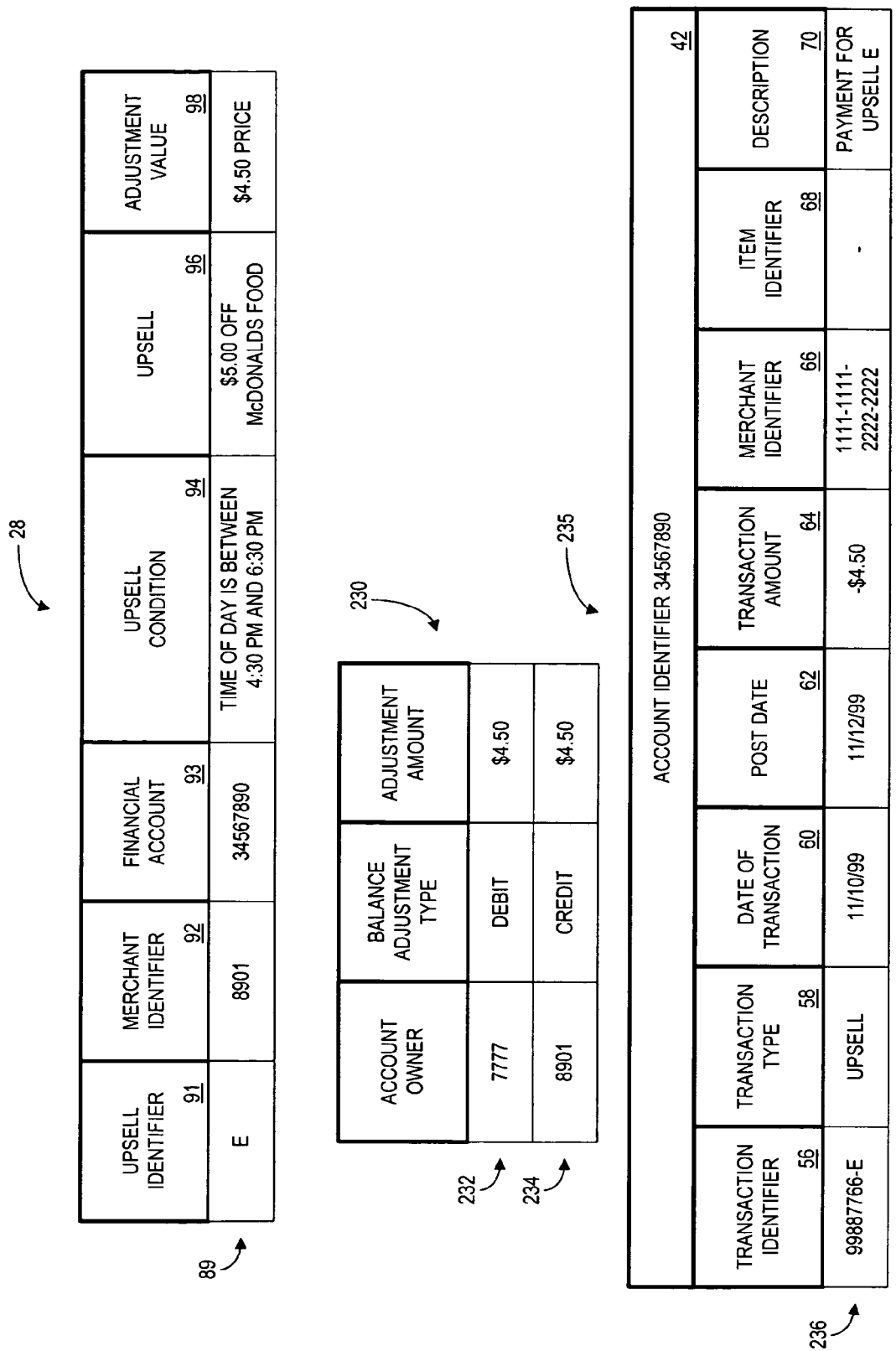
FIG. 10 is a schematic illustration of records employed in illustrating another use of an adjustment value.

Referring to FIG. 10, the entry 89 of FIG. 4 is depicted for use in the following additional exemplary use of an adjustment value. In this example, the customer makes a purchase at 5:00 PM at a POS terminal that is controlled by a merchant identified by "7777". The POS terminal displays an offer for the upsell specified by the entry 89 ($5 off McDonald's™ food). After the customer selects the offered upsell, the central controller 12 determines the corresponding adjustment value 98 ("$4.50 Price"), indicating that the customer pays $4.50 to the POS terminal operator in return for the $5 off a future purchase of McDonald's™ food.

The entry 89 also specifies that the merchant offering the upsell is a merchant identified by "8901". Accordingly, the merchant "8901" is to receive the $4.50 price the customer pays to the POS terminal operator for the upsell. A table 230 shows the reconciliation between the merchant "8901" and the merchant "7777". Such a table may merely represent transactions that the central controller 12 performs, or may correspond to an actual database of transactions stored on the central controller 12. The central controller 12 may, for example, debit a financial account belonging to the merchant "7777", as illustrated by the entry 232 of the table 230. In addition, the central controller 12 credits a financial account belonging to the merchant "8901" by $4.50, as shown by the entry 234.

In return for the $4.50 paid, an authorization code for uniquely identifying the customer's purchase is generated. The POS terminal prints the authorization code on a receipt that is given to the customer. The receipt and authorization code are redeemable for the specified $5.00 discount on a subsequent purchase at McDonald's. If desired, a POS terminal at the point of redemption may be equipped to receive and verify the authorization code. The code may be verified, for example, by transmitting the code to the central controller 12 and receiving a response indicating authorization. Once the code is verified, the POS terminal may automatically apply the discount by reducing the purchase price by $5.00 or crediting the customer's account by $5.00.

The financial transactions described by the table 230 may further describe transactions applied against respective financial accounts of the necessary parties, i.e. the merchant "7777" and the merchant "8901". As shown by the financial account 93 of the entry 89, the merchant "8901" has a financial account "34567890". A record 235 of the account holder transaction database 26 (FIG. 2) defines the transactions applied against the account "34567890". The displayed entry 236 of the record 235 describes a transaction corresponding to the $4.50 credit described by the entry 234 of the table 230. A similar entry for the $4.50 debit to the customer account would exist in a record (not shown in FIG. 10) defining transactions applied against an account of the merchant "7777". The transaction identifier "99887766-E" of the entry 236 comprises a prefix "99887766" and a suffix "E", thereby illustrating that the entry 236 defines an accepted upsell "E" that was generated for a transaction "99887766". Those skilled in the art will understand that there are other methods for associating a transaction defined by an upsell with a purchase transaction.

Figure 11:
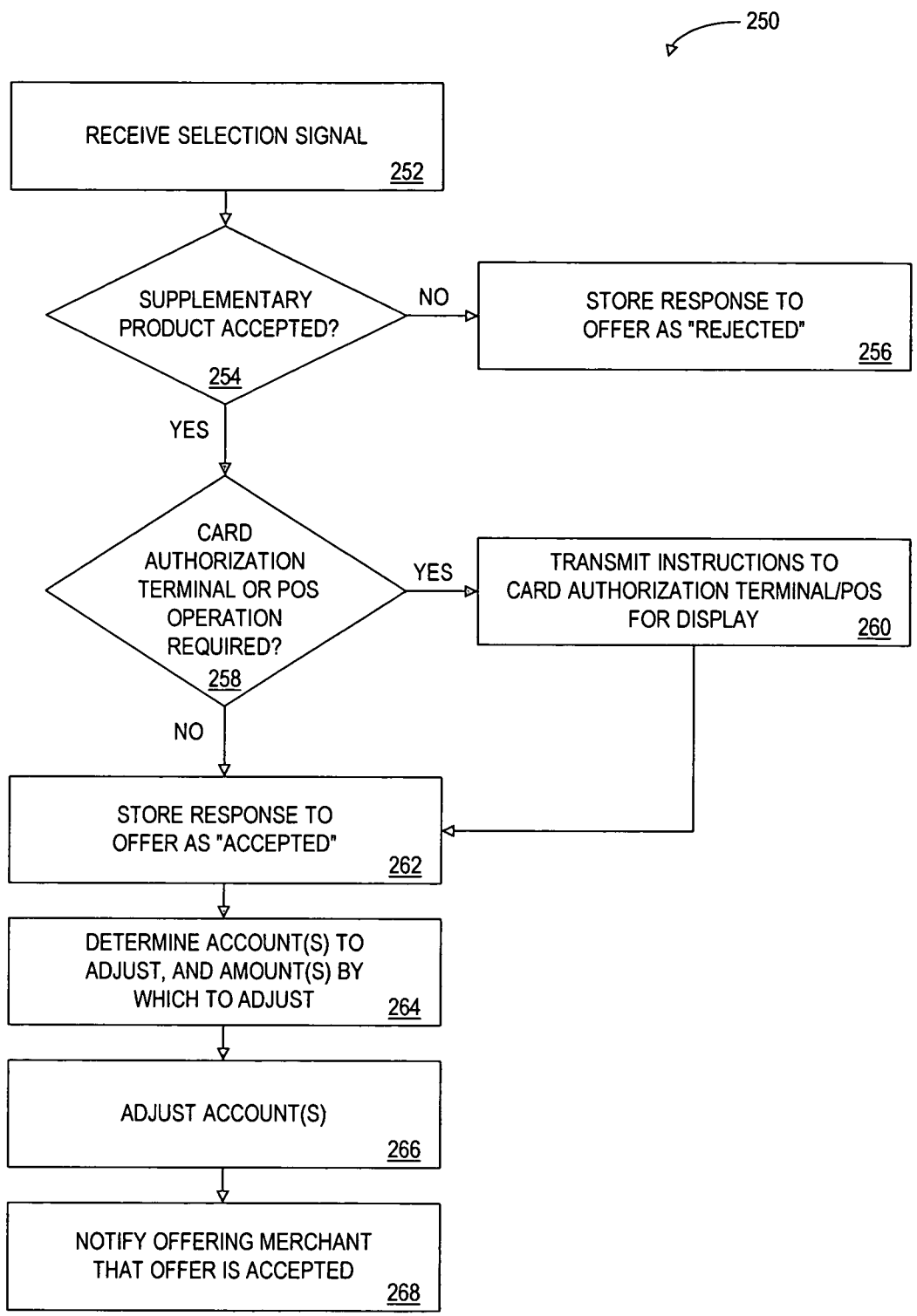
FIG. 11 is a flow chart illustrating a method for providing supplementary product sales to a customer at a card authorization terminal.

Referring to FIG. 11, a process 250 performed by the central controller 12 initiates upon receiving the selection signal from the CAT (step 252). If, at step 254, the selection signal indicates that the supplementary product is not accepted, then this negative response to the offer is stored (step 256). However, if the selection signal indicates that the supplementary product is accepted, then the central controller determines at step 258 whether any CAT or POS terminal operation instructions are required. If so, then appropriate instructions are transmitted to the CAT/POS for display (step 260).

The affirmative response to the offer is stored (step 262). The adjustment value corresponding to the accepted supplementary product indicates appropriate financial accounts and adjustment amounts (step 264). The central controller adjusts the balances of those financial accounts in dependence on the adjustment value (step 266). In addition, the appropriate merchant is notified that the offer was accepted (step 268).

Although the present invention has been described with respect to a preferred embodiment thereof, those skilled in the art will note that various substitutions may be made to those embodiments described herein without departing from the spirit and scope of the present invention. For example, the present invention is applicable to other types of financial accounts besides credit card accounts. In addition, although the above-description makes reference to POS terminals that include card authorization terminals, the present invention may be employed using devices such as automatic teller machines (ATMs) and personal computers which communicate with the central controller.

What is claimed is:

1. A method comprising:
    receiving, from a first merchant via an Internet connection, an indication of a purchase having an associated purchase price and at least one purchase parameter;
    determining, by a central controller, an upsell from a second merchant to offer to the customer based on the at least one purchase parameter, the upsell having associated therewith an upsell price;
    performing, by the central controller, a comparison to establish whether a credit account of the customer may be charged the upsell price;
    transmitting a product identifier for specifying the upsell;
    receiving a selection signal indicating that the upsell is accepted; and
    charging the upsell price to the credit account of the customer, the upsell price being in addition to the purchase price,
    wherein the method is performed by a party that is not the first merchant and is not the second merchant.

2. The method of claim 1, in which transmitting the product identifier for specifying the upsell comprises:
    transmitting, by the central controller, the product identifier for specifying the upsell.

3. The method of claim 1, in which the upsell comprises an offer to the customer for a service agreement.

4. The method of claim 1, in which the upsell comprises an offer to the customer for a subscription.

5. The method of claim 1, in which the upsell comprises an offer to the customer for a discount.

6. The method of claim 1, in which the upsell comprises a supplementary product.

7. The method of claim 1, further comprising:
    determining a merchant financial account in dependence on the upsell; and
    adjusting a balance of the merchant financial account in dependence on the upsell price.

8. The method of claim 1, in which the at least one purchase parameter comprises a customer account identifier for specifying a customer account.

9. The method of claim 8, further comprising:
    determining, from the customer account identifier, at least one previous purchase; and in which the step of determining an upsell comprises:
    determining an upsell to offer based on the at least one previous purchase.

10. The method of claim 8, further comprising:
    determining, from the customer account identifier, at least one previously-offered upsell; and in which the step of determining an upsell comprises:
    determining an upsell to offer based on the at least one previously-offered upsell.

11. The method of claim 1, in which the at least one purchase parameter comprises a credit account identifier for specifying the credit account.

12. A non-transitory computer readable memory storing instructions configured to direct a computing device to perform a method, the method comprising:
    receiving from a first merchant via a point-of-sale terminal an indication of a purchase having an associated purchase price and at least one purchase parameter;
    determining, by a central controller, an upsell from a second merchant to offer to the customer based on the at least one purchase parameter, the upsell having associated therewith an upsell price,
    in which the second merchant is different than the first merchant, and in which the point-of-sale terminal is not owned or controlled by the second merchant;

determining, by the central controller, whether a credit account of the customer may be charged the upsell price without exceeding a balance limit of the credit account;

transmitting to the point-of-sale terminal a product identifier for specifying the upsell;

receiving by the central controller via the point-of-sale terminal a selection signal indicating that the upsell is accepted; and charging the upsell price to the credit account of the customer, the upsell price being in addition to the purchase price, wherein the central controller is not owned or controlled by the first merchant or by the second merchant.

13. An apparatus comprising:

a processor; and a storage device in communication with the processor, the storage device storing instructions configured to direct the processor to perform steps of:

receiving from a point-of-sale terminal of a first merchant an indication of a purchase having an associated purchase price and at least one purchase parameter;

determining an upsell from a second merchant to offer to the customer based on the at least one purchase parameter, the upsell having associated therewith an upsell price, in which the second merchant is different than the first merchant, and in which the point-of-sale terminal is not owned or controlled by the second merchant;

determining whether a credit account of the customer may be charged the upsell price without exceeding a balance limit of the credit account;

transmitting to the point-of-sale terminal a product identifier for specifying the upsell;

receiving a selection signal indicating that the upsell is accepted; and charging the upsell price to the credit account of the customer, the upsell price being in addition to the purchase price, wherein the apparatus is not the first merchant and is not the second merchant.

14. The method of claim 1, in which the central controller is operated by a credit card issuer.

15. The method of claim 1,
in which the second merchant is different than the first merchant.

16. The method of claim 1, in which receiving the indication of the purchase comprises:
receiving, by the central controller from a point-of-sale terminal via the Internet connection, the indication of the purchase.

17. The method of claim 1, in which receiving the indication of the purchase comprises:
receiving, by the central controller from a personal computer via the Internet connection, the indication of the purchase.

18. The method of claim 1, in which performing the comparison comprises performing the comparison before transmitting the product identifier for specifying the upsell.

* * * * *